(12) United States Patent
Ninagawa

(10) Patent No.: US 8,737,996 B2
(45) Date of Patent: May 27, 2014

(54) COMMUNICATION SYSTEM, COMMUNICATION TERMINAL AND CONTROLLER

(75) Inventor: Takayasu Ninagawa, Anpachi (JP)

(73) Assignee: Kyocera Corporation, Kyoto (JP)

( * ) Notice: Subject to any disclaimer, the term of this patent is extended or adjusted under 35 U.S.C. 154(b) by 1193 days.

(21) Appl. No.: 11/861,602

(22) Filed: Sep. 26, 2007

(65) Prior Publication Data

US 2008/0081615 A1  Apr. 3, 2008

(30) Foreign Application Priority Data

Sep. 29, 2006 (JP) ................................. 2006-269400

(51) Int. Cl.
*H04W 4/00* (2009.01)

(52) U.S. Cl.
USPC ...................... 455/435.2; 455/426.1; 455/444; 455/436; 455/437; 455/428; 455/442; 455/443; 455/405; 455/406; 455/407; 455/408

(58) Field of Classification Search
USPC ........... 455/426.1, 435.2, 444, 436, 437, 428, 455/442, 443, 405, 406, 407, 408
See application file for complete search history.

(56) References Cited

U.S. PATENT DOCUMENTS

| | | | |
|---|---|---|---|
| 6,671,506 B1 * | 12/2003 | Lee ............................... | 455/406 |
| 7,406,324 B1 * | 7/2008 | McConnell ................... | 455/466 |
| 2006/0240828 A1 * | 10/2006 | Jain et al. ...................... | 455/436 |

FOREIGN PATENT DOCUMENTS

JP  2002-300321  10/2002

* cited by examiner

*Primary Examiner* — Justin Lee
(74) *Attorney, Agent, or Firm* — Duane Morris LLP

(57) ABSTRACT

A communication system of the invention includes a communication terminal correctable to first and second communication networks, and a controller for controlling service provision to the communication terminal according to which one of the first and second communication networks the communication terminal is connected to. The communication terminal includes: a reception determination unit for determining a reception condition of a control signal transmitted from the first communication network; and a notification transmitter for transmitting, to the controller, a notification indicating that the control signal can be received when the reception condition satisfies a certain requirement. The controller includes: a detector for detecting that the communication terminal can receive the control signal according to the notification; and a connection determination unit for determining that the communication terminal is connected to the first communication network when the communication terminal can receive the control signal while being connected to the second communication network.

6 Claims, 5 Drawing Sheets

COMMUNICATION SYSTEM, COMMUNICATION TERMINAL AND CONTROLLER

CROSS REFERENCE TO RELATED APPLICATIONS

This application is based upon and claims the benefit of priority from prior Japanese Patent Application No. 2006-269400, filed on Sep. 29, 2006; the entire contents of which are incorporated herein by reference.

BACKGROUND OF THE INVENTION

1. Field of the Invention

The present invention relates to a communication system including a communication terminal connectable to first and second communication networks, and a controller configured to control service provision to the communication terminal according to which one of the first and second communication networks the communication terminal is currently connected to. Moreover, the present invention also relates to a communication terminal and a controller in such a communication system.

2. Description of the Related Art

There has been known fixed mobile convergence (FMC) that allows a mobile terminal to establish communications with both a mobile phone network (hereinafter, called a "mobile network") and a fixed telephone network (hereinafter, called a "fixed network").

A mobile phone terminal that supports FMC (hereinafter, called a "FMC supported terminal") communicates with the fixed network through an access point (hereinafter abbreviated as an "AP") by use of short distance wireless communication techniques such as a wireless LAN and Bluetooth (registered trademark). A user can use a common telephone number for both connections of the FMC supported terminal to the fixed network and the mobile network.

When APs are installed, for example, for a home, one or multiple APs are usually Installed so as to have such a small-scale coverage that only the premises of the single home can be covered The FMC supported terminal is connected to the fixed network through the AP inside the premises, and is connected to the mobile network outside the premises. In a place where the FMC supported terminal can establish connections to both the fixed network and the mobile network, such as inside the premises, the FMC supported terminal preferentially establishes a connection to the fixed network.

In addition, in terms of charges for the FMC supported terminal, a fee for the mobile phone service is charged when the FMC supported terminal is connected to the mobile network, while a fee for the fixed telephone service is charged when the FMC supported terminal is connected to the fixed network. The connection fee for the fixed network is generally cheaper than that for the mobile network. For this reason, the most advantageous point for a user is that the user is charged only for the fixed network at home even while using a mobile phone terminal When the FMC supported terminal is used, however, there is a case where communication quality good enough to enable the FMC supported terminal to establish voice communications through AP cannot be maintained even near the AP, that is, inside the premises, because an obstacle blocks or interference win radio waves or because the AP is busy. There are two countermeasures against a failure in obtaining such good enough communication quality between the FMC supported terminal and the AP: (1) maintaining a connection with low communication quality between the FMC supported terminal and the fixed network; and (2) switching the network connected to the FMC supported terminal, to the mobile network.

If the connection with low communication quality between the FMC supported terminal and the fixed network is maintained, a risk of disconnection increases. If the network connected to the FMC supported terminal is switched to the mobile network, the communication quality can be prevented from deteriorating, but the connection fee increases since the fee for the mobile network is charged. In this case, the user is charged for the mobile network, while using the terminal in a place supposed to be charged for the fixed network. As a result, the user may be discontent with this changing, so that the user may make a complaint.

A solution for this problem is to widen the coverage of the AP by increasing the transmission power of the AP. This solution, however, may deteriorate the communication quality in an adjacent home because the adjacent home is subject to interference waves as a result of an increase of the transmission power of the AP. Another solution is to increase the number of APs installed in a home. However, this solution has problems of requiring a larger amount of costs and causing interference among the APs.

As described above, user's convenience is reduced when the difficulty of establishing a connection to a desired communication network (fixed network) forces a terminal to be connected to another communication network (mobile network). This problem of reducing user's convenience occurs not only between the fixed network and the mobile network, but also between any arbitrary types of communication networks.

SUMMARY OF THE INVENTION

A first feature of the present invention is a communication system including a communication terminal (for example, an FMC supported terminal 1) connectable to a first communication network (for example, an AP 2 and a fixed network 3) and a second communication network (for example, a mobile network base station 4 and a mobile network 5), and a controller (for example, an charging server 7) configured to control service provision to the communication terminal according to which one of the first and second communication networks the communication terminal is connected to. The communication terminal includes: a reception determination unit (a fixed network baseband unit 12 and an FMC connection controller 15) configured to determine a reception condition of a control signal transmitted from the first communication network; and a notification transmitter (an FMC connection controller 15) configured to transmit to the controller a notification indicating that the control signal can be received in a case where the reception condition satisfies a certain requirement. The controller includes: a detector (a detector 72) configured to detect that the communication terminal can receive the control signal, in response to the notification; and a connection determination unit (a connection determination unit 73) configured to determine that the communication terminal is connected to the first communication network in a case where the communication terminal can receive the control signal even while being connected to the second communication network, A second feature of the present invention is a communication terminal connectable to first and second communication networks. The communication terminal includes a reception determination unit configured to determine a reception condition of a control signal transmitted from the first communication network; and a notification transmitter configured to transmit, to a controller configured to control service provision to the communication terminal, a notification indicating that the control signal can be received in a case where the reception condition satisfies a certain requirement.

A third feature of the present invention is a controller configured to control service provision to a communication terminal according to which one of first and a second communication networks the communication terminal is connected to. The controller includes: a detector configured to detect that the communication terminal can receive the control signal, in response to a notification transmitted from the communication terminal, the notification indicating that the communication terminal can receive a control signal transmitted from the first communication network; and a connection determination unit configured to determine that the communication terminal is connected to the first communication network in a case where the communication terminal can receive the control signal while being connected to the second communication network.

DETAILED DESCRIPTION OF THE INVENTION

Figure 1:
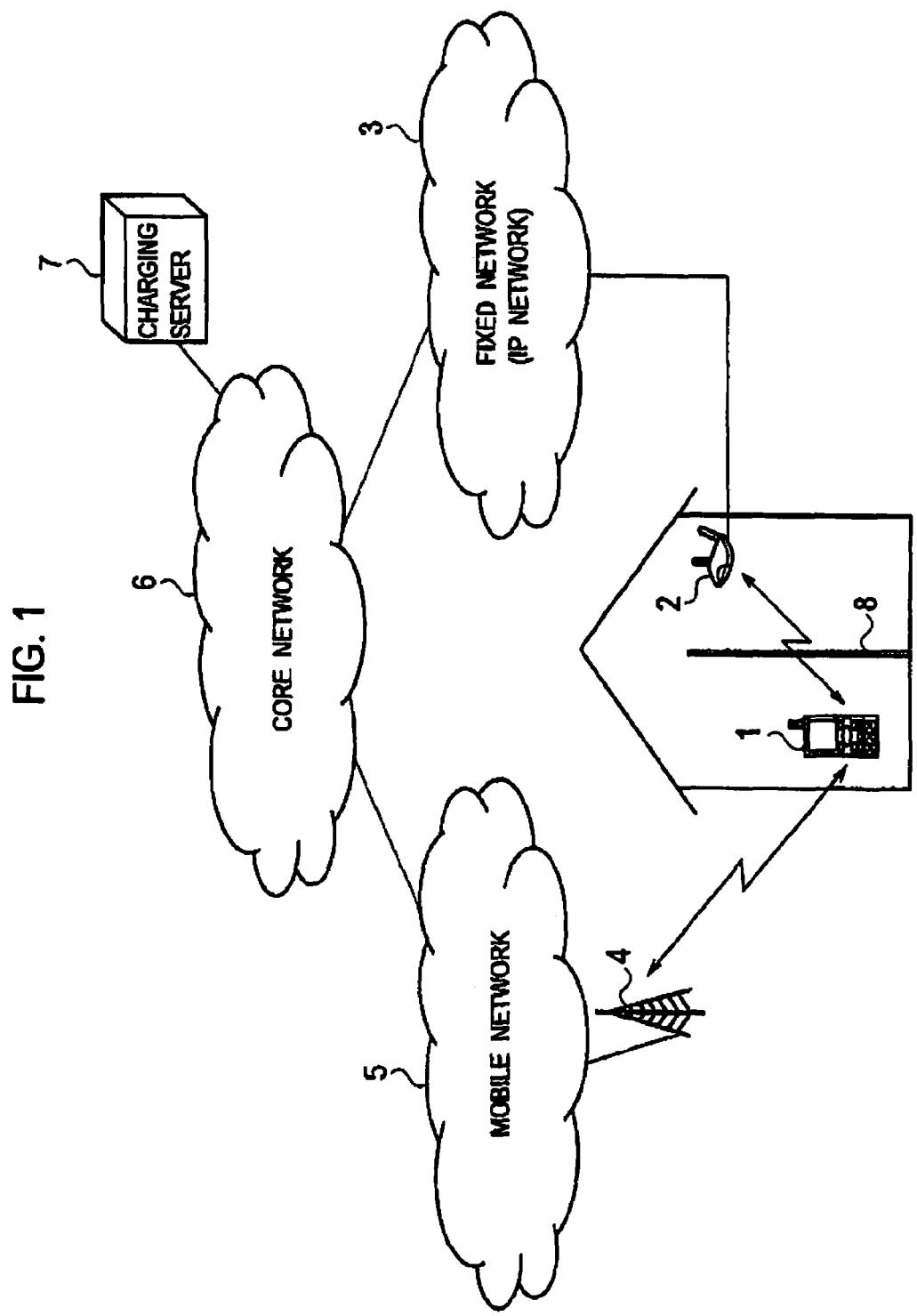
FIG. 1 is a diagram showing an entire configuration example of a communication system according to an embodiment of the present invention.

Hereinafter, embodiments of the present invention will be described with reference to the drawings. In the following descriptions of the drawings of the embodiments, the same or similar reference numerals are given to the same or similar components.

(Entire Configuration Example of Communication System)

First, descriptions will be provided for an entire configuration example of a communication system of a present embodiment. FIG. 1 is a diagram showing an entire configuration example of the communication system of this embodiment The communication system according to this embodiment includes an FMC supported terminal 1, an AP 2, a fixed network 3, a mobile network base station 4, a mobile network 5, a core network 6 and an charging server 7.

The FMC supported terminal 1 includes two types of radio communication interfaces, and is configured to be connectable to both the AP 2 for the fixed network 3 and the mobile network base station 4 for the mobile network 5.

The AP 2 is installed in a home of a user of the FMC supported terminal 1. The AP 2 periodically sends out control signals to the inside of the home. This control signal includes an identifier (for example, an extended service set identifier (ESSID)) for identifying the AP 2.

Note that, when a short distance wireless communication module Is mounted on a fixed telephone installed in the home, the fixed telephone can be used as the AP 2. Moreover, the fixed network 3 is formed, for example, as an Internet Protocol (IP) network.

The mobile network base station 4 forms a cell that is a communicable area. The FMC supported terminal 1 is located inside the cell of the mobile network base station 4. The mobile network 5 is formed, for example, as a radio access network (RAN).

The core network 6 mutually connects the fixed network 3 and the mobile network 5. The fixed network 3 and the mobile network 5 are configured to be communicable with each other through the core network 6.

The charging server 7 is configured to control charging for provisions of communication services to the FMC supported terminal 1. More precisely, the charging server 7 monitors which one of the fixed network 3 or the mobile network 5 the FMC supported terminal 1 is currently connected to, and charges a fee corresponding to a network to which the FMC supported terminal 1 is currently connected.

In the example in FIG. 1, there is a barrier 8 between the FMC supported terminal 1 and the AP 2. For this reason, even though being located inside the home, the FMC supported terminal 1 fails to establish voice communications with the AP 2, and is connected to the mobile network 5. However, even when failing to establish the voice communications, the FMC supported terminal 1 is capable of scanning the downlink control signals from the AP 2.

The FMC supported terminal 1 periodically attempts to receive the control signals from the AP 2 while making voice communications by connecting to the mobile network 5. When the FMC supported terminal 1 succeeds in receiving the control signal from the AP 2, the FMC supported terminal 1 transmits a notification (hereinafter, called a "fixed network reception notification") indicating a reception of the control signal, to the charging server 7 through the mobile network 5 or the fixed network 3. In addition, the FMC supported terminal 1 may determine whether or not the FMC supported terminal 1 can receive the control signal with a certain received power or with a certain error rate from the AP 2.

While receiving the fixed network reception notifications from the FMC supported terminal 1, the charging server 7 regards the FMC supported terminal 1 as locating inside the home, and accordingly charges the FMC supported terminal 1 for the fixed network (fixed telephone).

As such, in this embodiment, in a case where the FMC supported terminal 1 receives the fixed network reception notifications from the AP 2 even when being connected to and communicating with the mobile network 5, the charging server 7 regards the FMC supported terminal 1 as locating inside the home and charges the FMC supported terminal 1 for the fixed network (fixed telephone).

Accordingly, in a case where the communication quality good enough to make communications (for example, voice communications) cannot be maintained between the FMC supported terminal 1 and the AP 2 while the FMC supported terminal 1 is located inside the home, the charging server 7 charges the FMC supported terminal for the fixed network (fixed telephone). Such charging prevents a user from being discontent with the fees.

Note that, upon detecting that the FMC supported terminal 1 becomes unable to receive the control signal from the AP 2, the charging server 7 regards the FMC supported terminal 1 as locating outside the home and charges the FMC supported terminal 1 for the mobile network (mobile phone). The charging server 7 determines that the FMC supported terminal 1 becomes unable to receive the control signal from the AP 2, for example, by use of one of the following ways (1) and (2).

(1) A first way is for a case where the FMC supported terminal 1 transmits the fixed network reception notifications to the charging server 7 through the mobile network 5 (the mobile network base station 4). In this case, when the FMC supported terminal 1 fails to receive the control signal from the AP 2, the FMC supported terminal 1 transmits a notification (hereinafter, called a "fixed network reception failure notification") indicating the reception failure, to the charging server 7 through the mobile network 5 (the mobile network base station 4). When the charging server 7 receives the fixed network reception failure notifications for a certain period or longer, the charging server 7 charges the FMC supported terminal 1 for the mobile network 5.

(2) A second way is for a case where the FMC supported terminal 1 transmits the fixed network reception notifications to the charging server 7 through the fixed network 3 (the AP 2). In this case, when the charging server 7 does not receive any fixed network reception notification for a certain period or longer, the charging server 7 charges the FMC supported terminal 1 for the mobile network 5.

(Configuration Example of FMC Supported Terminal)

Figure 2:
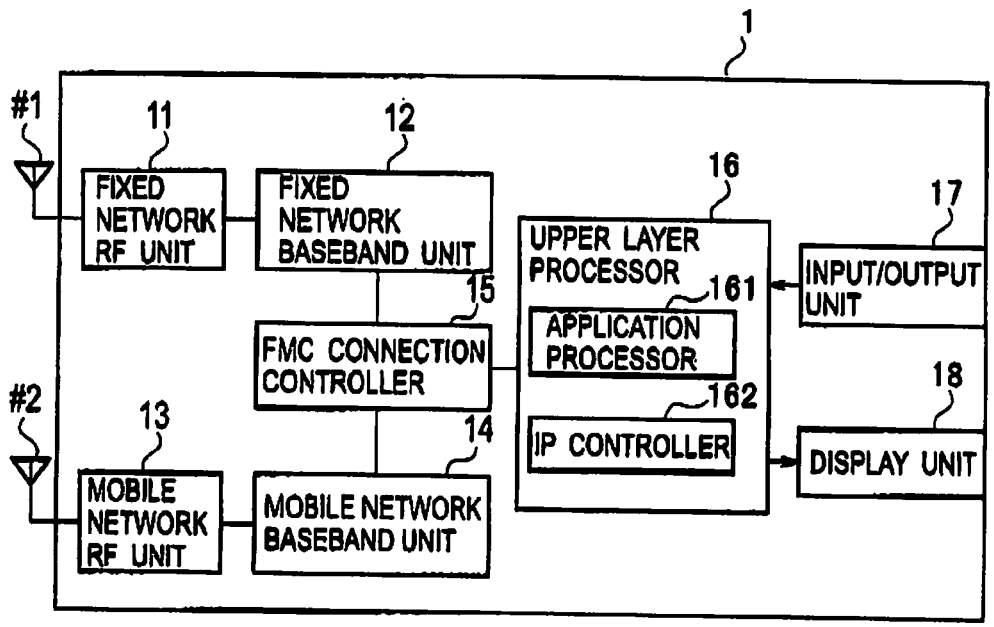
FIG. 2 is a functional block diagram showing a configuration example of an FMC supported terminal according to the embodiment.

Hereinafter, descriptions will be provided for a configuration example of the FMC supported terminal 1. FIG. 2 is a functional block diagram of the configuration example of the FMC supported terminal 1.

The FMC supported terminal 1 includes antennas #1 and #2, a fixed network high-radio-frequency unit (hereinafter, called a "fixed network RF unit") 11, a fixed network baseband unit 12, a mobile network high-radio-frequency unit (hereinafter, called a "mobile network RF unit") 13, a mobile network baseband unit 14, an FMC connection controller 15, an upper layer processor 16, an input/output unit 17 and a display unit 18.

The fixed network RF unit 11 and the fixed network baseband unit 12 are used to communicate with the fixed network 3. The mobile network RF unit 13 and the mobile network baseband unit 14 are used to communicate with the mobile network 5.

The fixed network RF unit 11 and the mobile network RF unit 13 have: a function of transmitting transmission signals as radio waves via the antennas #1 and #2 after performing upconversion, amplification and the like of the transmission signals; and a function of performing downconversion, amplification and the like of reception signals from the antennas #1 and #2.

When transmitting a signal, each of the fixed network baseband unit 12 and the mobile network baseband unit 14 performs D/A conversion of the transmission signal, also transforms the format of the transmission signal into a format suitable for communications, and then outputs the resultant signal to a corresponding one of the fixed network RF unit 11 and the mobile network RF unit 13. On the other hand, when receiving a signal each of the fixed network baseband unit 12 and the mobile network baseband unit 14 performs A/D conversion, demodulation and the like of the received signal, and then outputs the resultant signal to the FMC connection controller 15.

For instance, the fixed network RF unit 11 and the fixed network baseband unit 12 have configurations conforming to a wireless LAN scheme of IEEE802.11a/b/g and the like, or a short distance wireless communication scheme such as Bluetooth (registered trademark). On the other hand, the mobile network RF unit 13 and the mobile network baseband unit 14 have configurations conforming to a CDMA scheme or a GSM scheme.

The FMC connection controller 15 controls which one of the fixed network 3 and the mobile network 5 the FMC supported terminal 1 is connected to and is made ready for waiting to receive signals from. For example, when the reception level from the fixed network 3 (the AP 2) becomes equal to or greater than a threshold value, the FMC connection controller 15 controls the fixed network RF unit 11 and the fixed network baseband unit 12 so that the FMC supported terminal 1 connects to and be ready for waiting to receive signals from the fixed network 3. Note that, the FMC connection controller 15 stores the identifier of the AP 2 in advance, and establishes a connection to the AP 2 if the identifier contained in the received control signal is identical to the identifier stored in advance.

In addition, even while being connected to the mobile network 5, the FMC connection controller 15 issues commands to the fixed network baseband unit 12, and thereby attempts to receive the control signal at the passage of every certain period.

The upper layer processor 16 includes an application processor 161 and an IP controller 162. The application processor 161 is configured to perform certain applications. The IP controller 162 is configured to control communications in accordance with predefined protocols (for example, TCP, UDP, SIP, etc.).

The input/output unit 17 includes a microphone for inputting voice, a speaker for outputting voice, numeric keys for inputting the telephone number of a call destination at a time of making a call, a call start key for giving a command to start a call, a call termination key for giving a command to terminate a call, and the like. The display unit 18 is configured, for example, by a liquid crystal display device (LCD), and displays various kinds of information under controls of the upper layer processor 16.

(Configuration Example of Charging Server)

Figure 3:
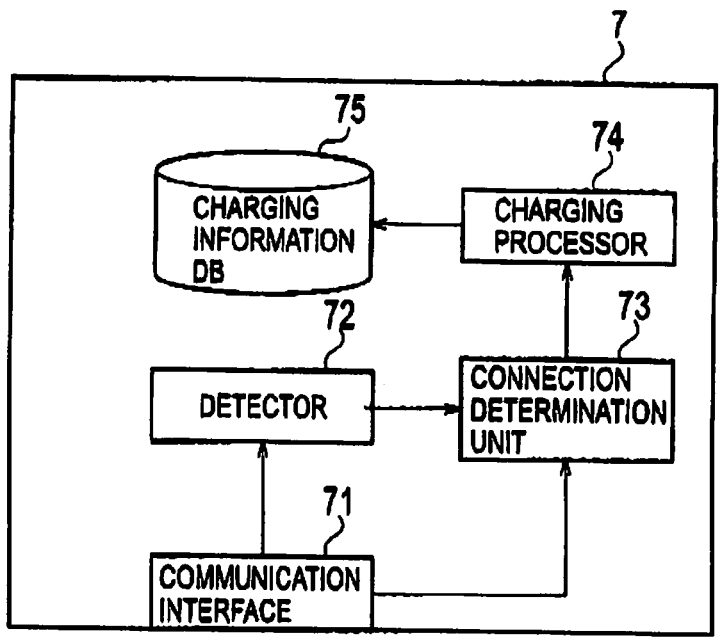
FIG. 3 is a functional block diagram showing a configuration example of an charging server according to the embodiment of the present invention.

Hereinafter, descriptions will be provided for a configuration example of the charging server 7. FIG. 3 is a functional block diagram showing the configuration example of the charging server 7.

The charging server 7 includes a communication interface (hereinafter, called a "communication I/F") 71 and a detector 72, a connection determination unit 73, an charging processor 74 and an charging information database (hereinafter, called an "charging information DB") 75.

The communication I/F 71 functions as an interface for the core network 6. By using the fixed network reception notification, the detector 72 detects that the FMC supported terminal 1 can receive the control signals from the AP 2.

The connection determination unit 73 determines which one of the mobile network 5 and the fixed network 3 the FMC supported terminal 1 is connected to. As described above, the connection determination unit 73 determines that the FMC supported terminal 1 is connected to the fixed network 3 (the AP 2) when the FMC supported terminal 1 can receive the control signals from the AP 2 even while being connected to the mobile network 5 (the mobile network base station 4).

The charging processor 74 performs charging processing based on the determination result of the connection determination unit 73. The charging information DB 75 stores charging information for the FMC supported terminal 1 therein. More precisely, the charging information DB 75 stores the terminal identifier of the FMC supported terminal 1, the connection fee for the fixed network 3 and the connection fee for the mobile network 5 in association with one another.

(Outline of Operations of Communication System)

Figure 4:
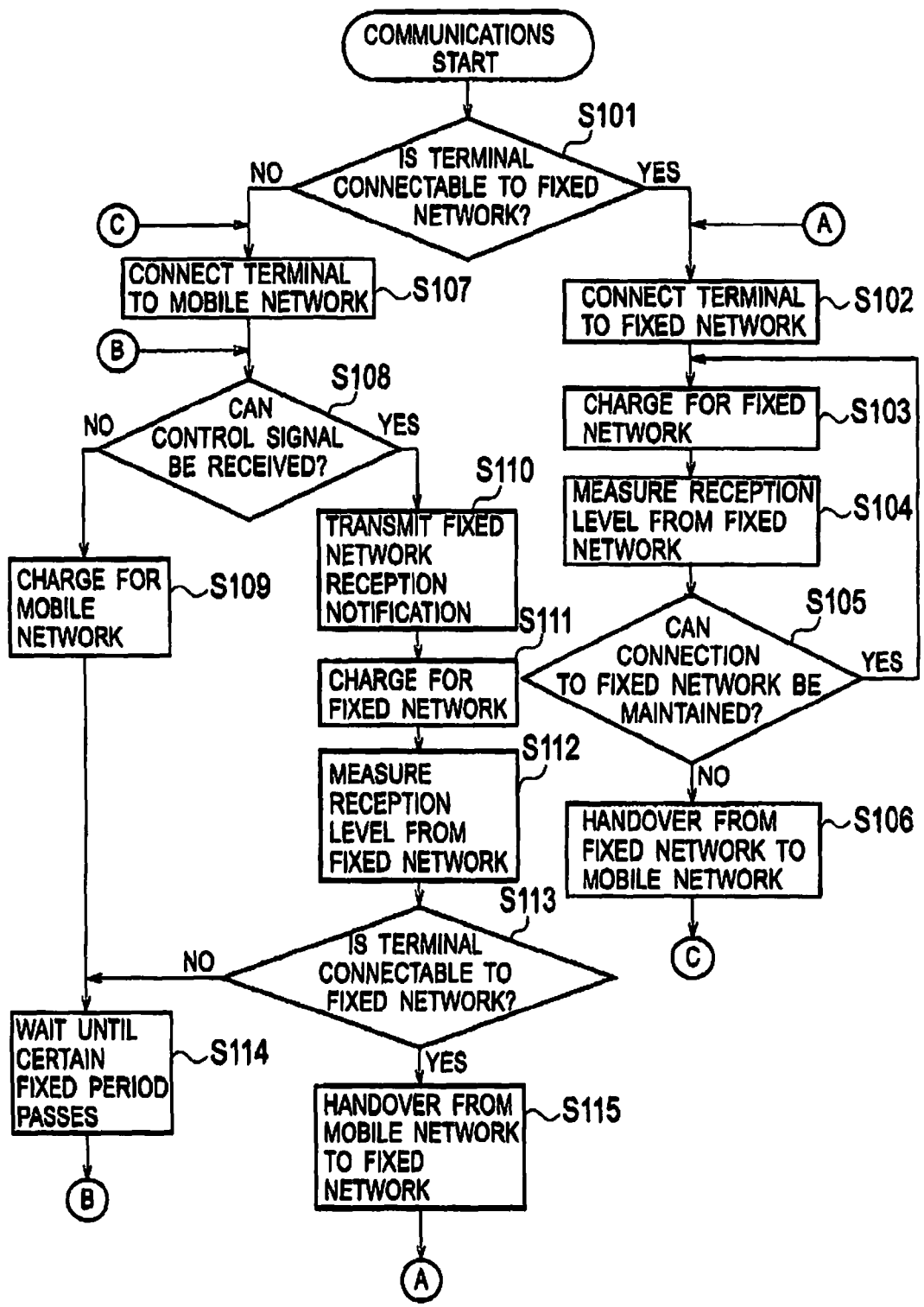
FIG. 4 is a flowchart showing the outline of operations of the communication system according to this embodiment.

Hereinafter, descriptions will be provided for the outline of operations of the communication system according to this embodiment Here, the descriptions to be provided are divided into two parts of (1) a case: the FMC supported terminal 1 performs handover from the fixed network 3 to the mobile network 5; and (2) a case: the FMC supported terminal 1 performs handover from the mobile network 5 to the fixed network 3. FIG. 4 is a flowchart showing the outline of the operations of the communication system according to this embodiment (1) A case: the FMC supported terminal 1 performs handover from the fixed network 3 to the mobile network 5

In step S101, the FMC supported terminal 1 determines whether or not the FMC supported terminal 1 is connectable to the fixed network 3. Precisely, the FMC supported terminal 1 is determined as being connectable to the fixed network 3 when the FMC supported terminal 1 can receive the control signals from the AP 2, and when the reception level from the AP 2 is equal to or greater than a threshold value. Here, suppose that the FMC supported terminal 1 is determined as being connectable to the fixed network 3, thereby moving the processing to step S102.

In step S102, the FMC supported terminal 1 establishes a connection to the fixed network 3.

In step S103, the charging server 7 charges the FMC supported terminal 1 for the fixed network 3.

In step S104, the FMC supported terminal 1 measures the reception level from the fixed network 3 (the AP 2). Here, what is measured is the reception level. Instead of the reception level however, an error rate (for example, a bit error rate or a block error rate) may be used.

In step S105, the FMC supported terminal 1 determines whether or not the FMC supported terminal 1 can maintain the connection to the fixed network 3. More specifically, the FMC supported terminal 1 compares the reception level measured in step S104 with the threshold value. When the reception level is equal to or greater than the threshold value, it is determined that the FMC supported terminal 1 can maintain the connection to the fixed network 3. When it is determined that the FMC supported terminal 1 can maintain the connection to the fixed network 3, the processing moves to step S103. On the other hand, when it is determined that the FMC supported terminal 1 cannot maintain the connection to the fixed network 3, in other words, when it is determined that the communication quality cannot be maintained at the required level, the processing moves to step S106.

In step S106, the FMC supported terminal 1 performas handover from the fixed network 3 to the mobile network 5. Once the handover from the fixed network 3 to the mobile network 5 is performed, the processing moves to step S107.

(2) A case: the FMC supported terminal 1 performs handover from the mobile network 5 to the fixed network 3

In step S101, the FMC supported terminal 1 determines whether or not the FMC supported terminal 1 is connectable to the fixed network 3. Here, suppose that the FMC supported terminal 1 is determined as being unconnectable to the fixed network 3, thereby moving the processing to step S107.

In step S107, the FMC supported terminal 1 establishes a connection to the mobile networks.

In step S108, the FMC supported terminal 1 determines whether or not the FMC supported terminal 1 can receive the control signal from the AP 2. Or, the FMC supported terminal 1 may determine whether or not the FMC supported terminal 1 can receive the control signal with a certain received power or with a certain error rate from the AP 2. When the control signal can be received, the processing moves to step S110. In contrast, when the control signal cannot be received, me recessing moves to step S109.

In step S109, the charging server 7 charges the FMC supported terminal 1 for the mobile network 5.

In step S110, the FMC supported terminal 1 transmits the fixed network reception notification to the charging server 7 through the mobile network 5 or the fixed network 3.

In step S111, the charging server 7 does not charge the FMC supported terminal 1 for the mobile network 5 to which the FMC supported terminal 1 is actually connected, but charges for the fixed network 3.

In step S112, the FMC supported terminal 1 measures the reception level from the fixed network 3 (the AP 2).

In step S113, the FMC supported terminal 1 determines whether or not the FMC supported terminal 1 is connectable to the fixed network 3. When the FMC supported terminal 1 is determined as being connectable to the fixed network 3, the processing moves to step S115. In contrast, when it is determined that the FMC supported terminal 1 is unconnectable to the fixed network 3, in other words, when it is determined that the communications cannot be carried out at a predetermine level of quality, the processing moves to step S114.

In step S114, the charging server 7 waits until a certain fixed period passes, and thereafter, the processing moves to step S108.

In step S115, the FMC supported terminal 1 performs handover from the mobile network 5 to the fixed network 3. Once the handover from the mobile network 5 to the fixed network 3 is performed, the processing moves to step S102.

(Example of Operation Sequence of Communication System)

Figure 5:
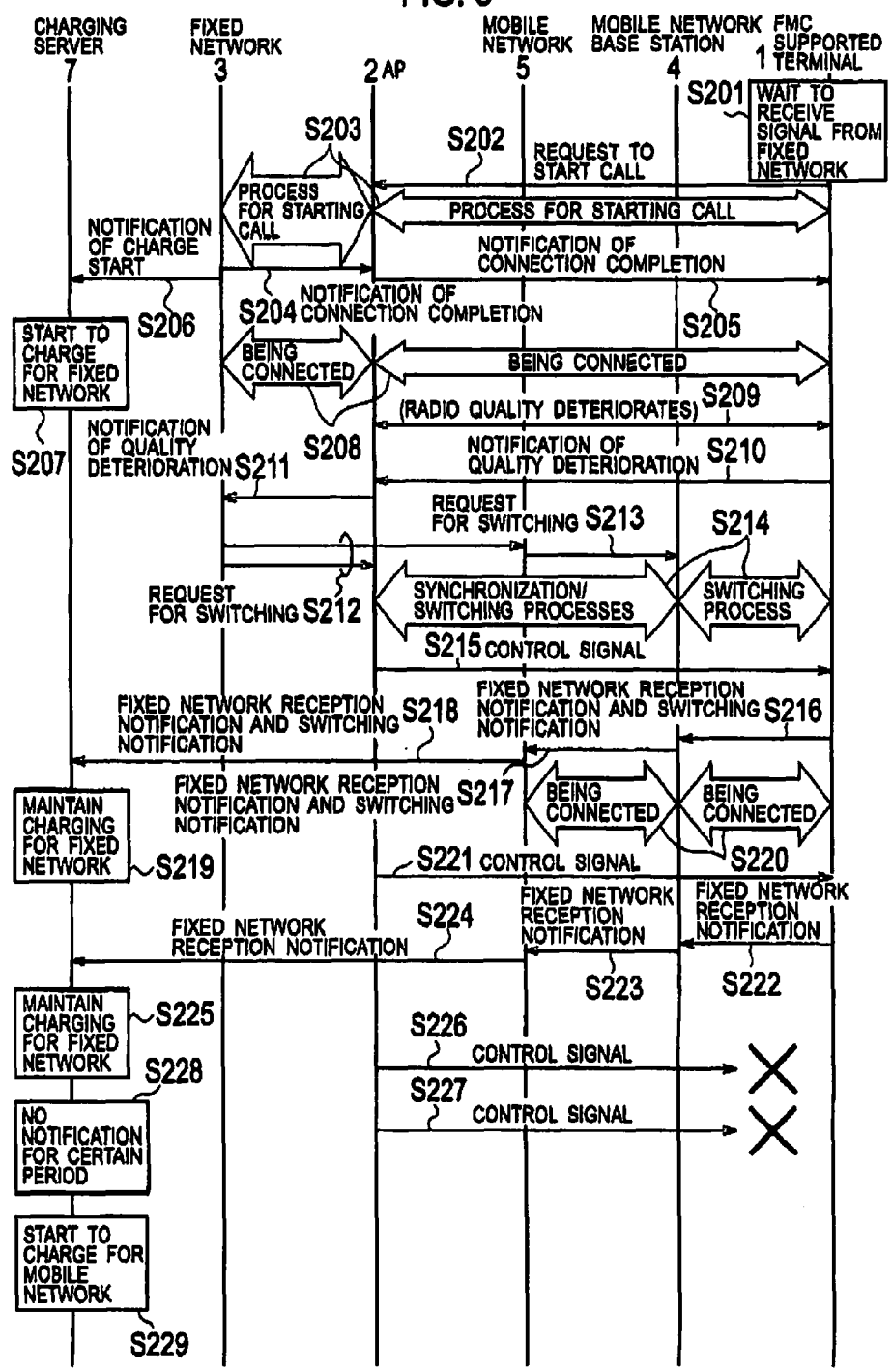
FIG. 5 is a sequence diagram showing a detailed example of operations of the communication system according to the embodiment of the present invention.

Hereinafter, descriptions will be provided for an example of an operation sequence of the communication system according to this embodiment. FIG. 5 is a sequence diagram showing the operation sequence of the communication system according to this embodiment. In this sequence diagram, since the communication quality in the fixed network 3 deteriorates while the FMC supported terminal 1 is communicating with the fixed network 3, the FMC supported terminal 1 performs handover from the fixed network 3 to the mobile network 5. Moreover, FIG. 5 shows the subsequent operation sequence in a case where the FMC supported terminal 1 becomes unable to receive the control signal from the fixed network 3 (the AP 2).

In step S201, the FMC supported terminal 1 waits to receive signals from the fixed network 3.

In step S202, the FMC supported terminal 1 transmits a call start request to the AP 2. In step S203, predetermined processing for call start among the fixed network 3, the AP 2 and the FMC supported terminal 1 is executed, and thereby the communications start.

In step S204, the fixed network 3 transmits a notification of connection completion to the AP 2. In step S205, the AP 2 transmits the notification of connection completion from the fixed network 3, to the FMC supported terminal 1. In step S208, the AP 2 and the FMC supported terminal 1 become connected to each other.

In step S206, the fixed network 3 notifies the charging server 7 of a start of charging for the fixed network 3. When the charging server 7 is notified of the start of charging for the fixed network 3, the charging server 7 starts to charge the FMC supported terminal 1 for the fixed network 3 in step S207.

Here, suppose that the communication quality between the AP 2 and the FMC supported terminal 1 becomes so poor that the maintaining of the communication quality at a high level becomes difficult in step S209.

In step S210, the FMC supported terminal 1 transmits to the AP 2 a notification of quality deterioration indicating that the communication quality becomes poor. In step S211, to the fixed network 3, the AP 2 transmits the notification of quality deterioration received from the FMC supported terminal 1.

In step S212, to the AP 2 and the mobile network 5, the fixed network 3 transmits a switching request to switch the connection of the FMC supported terminal 1 to the mobile network 5. In step S213, to the mobile network base station 4, the mobile network 5 transmits the switching request received from the fixed network 3. In step S214, synchronization processing and switching processing are performed between the AP 2 and the mobile network base station 4, and switching processing is performed between the FMC supported terminal 1 and the mobile network base station 4.

In step S215, the AP 2 transmits the control signal to the FMC supported terminal 1. In step S216, the FMC supported terminal 1 transmits, to the mobile network base station 4, a fixed network reception notification and a switching notification indicating that the connection is switched. In step S217, to the mobile network 5, the mobile network base station 4 transmits the fixed network reception notification and the switching notification received from the FMC supported terminal 1. In step S218, to the charging server 7, the mobile network 5 transmits the fixed network reception notification and the switching notification received from the mobile network base station 4.

In step S219, upon receipt of the fixed network reception notification and the switching notification, the charging server 7 keeps charging for the fixed network 3 without switching to charge for the mobile network 5.

In step S220, the FMC supported terminal 1 and the mobile network 5 are connected to each other through the mobile network base station 4.

In step S221, the AP 2 transmits the control signal to the FMC supported terminal 1. In step S222, the FMC supported terminal 1 transmits the fixed network reception notification to the mobile network base station 4. In step S223, the mobile network base station 4 transmits the fixed network reception notification to the mobile network 5. In step S224, the mobile network 5 transmits the fixed network reception notification to the charging server 7. In step S225, the charging server 7 keeps charging for the fixed network 3.

In steps S226 and S227, since the communication quality between the AP 2 and the FMC supported terminal 1 further deteriorates, the control signals transmitted from the AP 2 do not reach the FMC supported terminal 1. As a result, the charging server 7 does not receive any fixed network reception notification.

In step S228, the charging server 7 determines that the fixed network reception notification is not received for a certain period. In step S229, the charging server 7 switches to charge for the mobile network 5 instead of the fixed network 3.

(Efficiency)

As described above, according to this embodiment, in a case where the FMC supported terminal 1 can receive the control signal from the fixed network 3, the FMC supported terminal 1 can be regarded as being connected to the fixed network 3 even though the FMC supported terminal 1 is actually connected to the mobile network 5. Accordingly, when the FMC supported terminal 1 is connected to the mobile network 5 due to the difficulty of establishing the connection to the fixed network 3, the FMC supported terminal 1 can be treated in the same way as in the case where the FMC supported terminal 1 is connected to the fixed network 3. This consequently makes it possible to provide a communication system capable of improving user's convenience and of eliminating causes for user's discontent while always maintaining the communication quality at a certain good enough or better level without increasing the output level of the AP nor increasing the number of installed APs.

FIRST MODIFIED EXAMPLE

Figure 6:
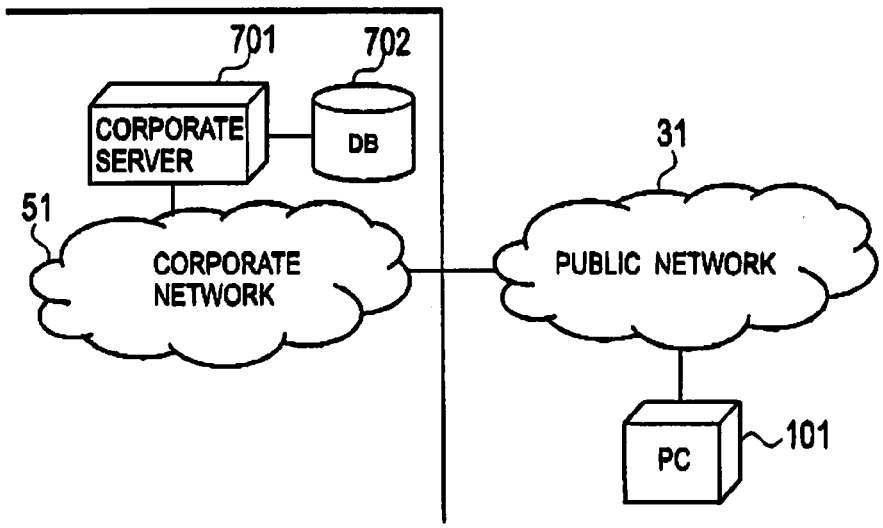
FIG. 6 is a diagram showing an entire configuration example of a communication system according to a first modified example of the embodiment of the present invention.

Another system configuration different from the communication system according to the aforementioned embodiment will be described as a first modified example of the embodiment of the present invention. FIG. 6 is a diagram showing an entire configuration example of a communication system according to the first modified example.

The communication system recording to the first modified example includes a corporate (inhouse) network (first communication network) 51, a corporate server (controller) 701, a corporate DB 702, a public network (second communication network) 31 and a PC (communication terminal) 101 having a communication function.

An access to the corporate DB 702 is usually permitted only from the inside of the company. However, when the PC 101 can receive control signals from the corporate network 51, the PC 101 builds a virtual private network (VPN) on the public network 31. As a result, the PC 101 can access the corporate DB 702 through the corporate server 701. In this case, the corporate server 701 performs account management at a time when the PC 101 accesses the corporate DB 702.

In this way, according to the first modified example, as long as the PC 101 can receive the control signals from the corporate network 51, the PC 101 is regarded as being connected to the corporate network 51 even though actually being connected to the public network 31. Consequently, the PC 101 is enabled to access the corporate DB 702 on the corporate network 51 even while actually being connected to the public network 31.

SECOND MODIFIED EXAMPLE

Figure 7:
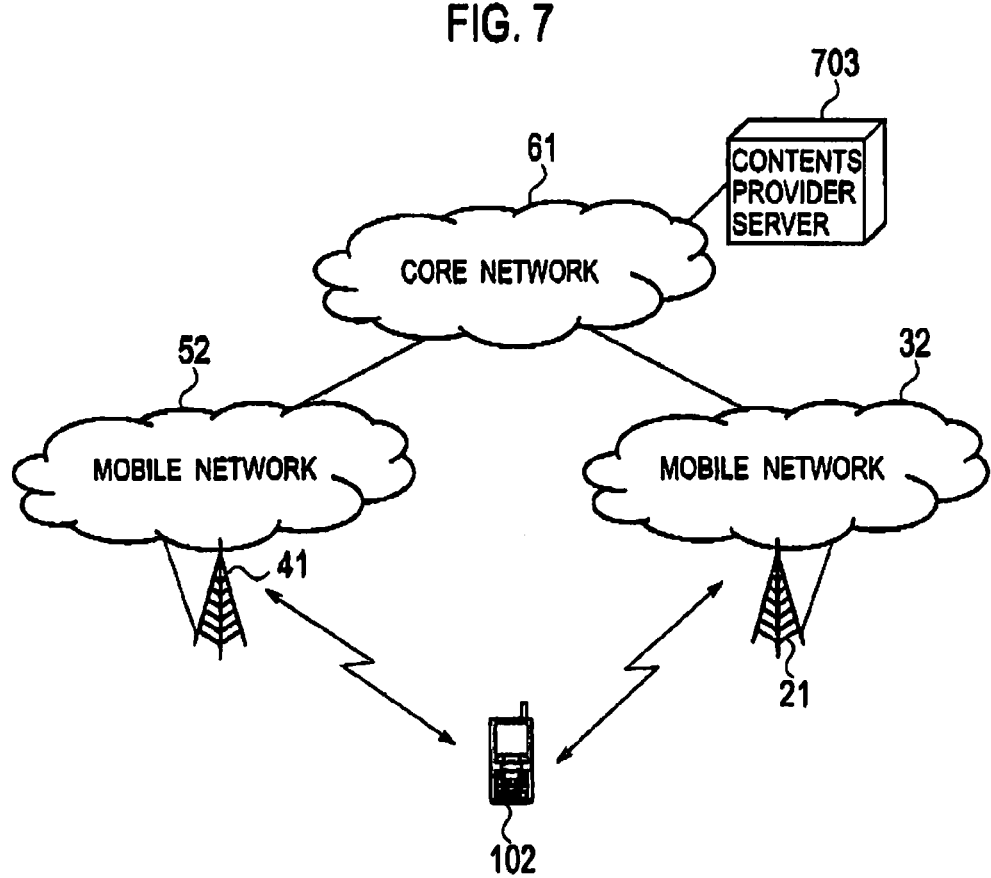
FIG. 7 is a diagram showing an entire configuration example of a communication system according to a second modified example of the embodiment of the present invention.

Another system configuration different from the communication system according to the aforementioned embodiment will be described as a second modified example of the embodiment of the present invention. FIG. 7 is a diagram showing an entire configuration example of a communication system according to the second modified example.

The communication system according to the second modified example includes a mobile phone terminal (communication terminal) 102, a mobile network 32 (first communication network), a base station 21 of the mobile network 32, a mobile network 52 (second communication network), and a base station 41 of the mobile network 52, a core network 61 and a contents provider server (controller) 703.

In a border area in a region, such as Europe, where countries are adjacent to each other, the mobile phone terminal 102 can establish connections to both the mobile network 32 and its base station 21 installed in a certain country (for example, a country A) and the mobile network 52 and its base station 41 installed in another country (for example, a country B).

When the contents provider server 703 provides contents only to the country A, the mobile phone terminal 102 located in the country B cannot receive the contents from the contents provider server 703.

In this situation, as similar to the foregoing embodiment, the contents provider server 703 is set so as to provide the contents to the mobile phone terminal 102 when the mobile phone terminal 102 can receive control signals from the base station 21. Thus, the mobile phone terminal 102 can access the contents provided to the country A, even while being located in the country B.

(Other Embodiments)

As described above, the present invention has been described by using the embodiment. However, it should not be understood that the present invention is limited to the descriptions and the drawings constituting part of this disclosure. It is obvious from this disclosure to those skilled in the art to find various alternative embodiments, modified examples and applied techniques.

For example, suppose a case where the first communication network delivers narrow area information such as ad information of shops inside the premises of a station building, and where the second communication network delivers wide area information. In this case, when a communication terminal can receive control signals from the first communication network, the communication terminal is surely located near the station building. Accordingly, the communication system may be configured to deliver the information of the first communication network to the communication terminal.

In this way, it should be understood that the present invention also includes various embodiments and the like not described in this description. Accordingly, the present invention is only defined by the subject matters of the invention according to the scope of the invention as defined by the appended claims appropriate for this disclosure.

What is claimed is:

1. A communication control system configured to provide services to a communication terminal connectable to a first communication network and a second communication network, wherein the communication terminal is further configured to receive a control signal transmitted from the first communication network, the control system comprising:
    a controller configured to control service provision to the communication terminal according to which one of the first communication network and the second communication network the communication terminal is connected to;
    a detector configured to detect that the communication terminal has received the control signal, in response to a notification signal received from the communication terminal, wherein the notification signal indicates whether the control signal has been received by the communication terminal and whether a reception condition of the control signal satisfies a certain requirement; and
    a connection determination unit configured to indicate that the communication terminal is connected to the first communication network, if the communication terminal has received the control signal and the reception condition of the control signal satisfies the certain requirement, even though the communication terminal is actually connected to the second communication network, thereby allowing a service to be provided to the communication terminal as if it were connected to the first communication network, wherein the first communication network and the second communication network are different communication networks and wherein the service comprises charging a fee corresponding to the communication terminal being connected to the first communication network.

2. The communication system according to claim 1, wherein the first communication network includes a fixed telephone network and an access point, the second communication network includes a mobile phone network and a base station, and the access point is configured to transmit the control signal.

3. The communication system according to claim 1, wherein the controller is configured to control provision of a content to the communication terminal.

4. The communication control system of claim 1 wherein the service comprises providing content to the communication terminal that is otherwise not available to the communication terminal when it is connected to the second communication network.

5. A communication terminal connectable to a first communication network and a second communication network, comprising:
    a receiver configured to receive a control signal transmitted from the first communication network;
    a reception determination unit configured to determine whether a reception condition of the control signal received by the receiver satisfies a certain requirement; and
    a notification transmitter configured to transmit, to a controller configured to control service provision to the communication terminal, a notification indicating that the control signal can be received, in a case where the reception determination unit determines that the reception condition satisfies the certain requirement wherein, if the receiver has received the control signal and the reception condition of the control signal satisfies the certain requirement, the communication terminal is provided a service by the controller as if it were connected to the first communication network even though the communication terminal is actually connected to the second communication network, wherein the first communication network and the second communication network are different communication networks and wherein the service comprises charging a fee corresponding to the communication terminal being connected to the first communication network.

6. The communication terminal of claim 5, wherein the service comprises providing content to the communication terminal that is otherwise not available to the communication terminal when it is connected to the second communication network.

* * * * *